United States Patent
Qi et al.

(10) Patent No.: US 12,375,506 B2
(45) Date of Patent: Jul. 29, 2025

(54) IOV INTRUSION DETECTION METHOD AND DEVICE BASED ON IMPROVED CONVOLUTIONAL NEURAL NETWORK

(71) Applicant: NANJING UNIVERSITY OF SCIENCE AND TECHNOLOGY, Jiangsu (CN)

(72) Inventors: Yong Qi, Jiangsu (CN); Mingjun Liu, Jiangsu (CN); Jianye Yu, Jiangsu (CN)

(73) Assignee: NANJING UNIVERSITY OF SCIENCE AND TECHNOLOGY, Jiangsu (CN)

( * ) Notice: Subject to any disclaimer, the term of this patent is extended or adjusted under 35 U.S.C. 154(b) by 0 days.

(21) Appl. No.: 18/579,856

(22) PCT Filed: Feb. 7, 2023

(86) PCT No.: PCT/CN2023/074762
§ 371 (c)(1),
(2) Date: Jan. 16, 2024

(87) PCT Pub. No.: WO2023/147786
PCT Pub. Date: Aug. 10, 2023

(65) Prior Publication Data
US 2024/0244066 A1    Jul. 18, 2024

(30) Foreign Application Priority Data
Feb. 7, 2022    (CN) .......................... 202210116021.4

(51) Int. Cl.
*H04L 9/40*    (2022.01)
*G06N 3/045*    (2023.01)
(Continued)

(52) U.S. Cl.
CPC ......... *H04L 63/1416* (2013.01); *G06N 3/045* (2023.01); *G06N 3/0464* (2023.01); *G06N 3/084* (2013.01)

(58) Field of Classification Search
CPC .. H04L 63/1416; G06N 3/045; G06N 3/0464; G06N 3/084; G06N 3/08; H04W 4/44
See application file for complete search history.

(56) References Cited

U.S. PATENT DOCUMENTS 10,928,830 B1 *  2/2021  Tran ...................... B60W 30/12
10,955,855 B1 *  3/2021  Tran ...................... G06T 17/00
(Continued)

OTHER PUBLICATIONS

Nie, et al., Data-Driven Intrusion Detection for Intelligent Interne of Vehicles; A Deep Convolutional Neural Network-based Method, Oct.-Dec. 2020, IEEE Transactions on Network Science and Engineering, vol. 7, No. 4 (Year: 2020).*

Primary Examiner — Oleg Survillo
(74) Attorney, Agent, or Firm — DLA Piper LLP (US)

(57) ABSTRACT

The present disclosure belongs to the technical field of Internet of vehicles (IoV) security and provides an IoV intrusion detection method and device based on an improved convolutional neural network. The method of the present disclosure includes: collecting original data of data traffic during IoV communication, and inputting the original data to a data dimension reduction algorithm model for IoV intrusion detection for preprocessing to obtain standardized data for IoV data analysis; inputting the standardized data for IoV data analysis to an improved convolutional neural network model for calculation, including: performing convolutional calculation and nonlinear activation on the input data for layering; performing two convolutional operations, two pooling operations and one full connection operation on (Continued)

each layer of data; and classifying a data set output by the improved convolutional neural network model through a SoftMax layer.

20 Claims, 7 Drawing Sheets

(51) Int. Cl.
*G06N 3/0464* (2023.01)
*G06N 3/08* (2023.01)
*G06N 3/084* (2023.01)
*H04W 4/44* (2018.01)

(56) References Cited

U.S. PATENT DOCUMENTS

| | | |
|---|---|---|
| 11,503,057 B2 * | 11/2022 | Qi ........................ H04L 63/1416 |
| 2022/0217170 A1 * | 7/2022 | Qi ............................ G06N 3/08 |
| 2022/0377094 A1 * | 11/2022 | Islam ...................... H04L 67/12 |

* cited by examiner

IOV INTRUSION DETECTION METHOD AND DEVICE BASED ON IMPROVED CONVOLUTIONAL NEURAL NETWORK

CROSS REFERENCE TO RELATED APPLICATION

This patent application is a national stage application of International Patent Application No. PCT/CN2023/074762, filed Feb. 7, 2023, which claims the benefit and priority of Chinese Patent Application No. 202210116021.4 filed with the China National Intellectual Property Administration on Feb. 7, 2022, and entitled "IOV INTRUSION DETECTION METHOD AND DEVICE BASED ON IMPROVED CONVOLUTIONAL NEURAL NETWORK", the disclosures of which are incorporated by reference herein in their entireties as part of the present application.

TECHNICAL FIELD

The present disclosure belongs to the technical field of Internet of vehicles (IoV) security, and in particular, to an IoV intrusion detection method and device based on an improved convolutional neural network.

BACKGROUND

In recent years, with the practical application of emerging technologies in the field of IoVs, IoVs have developed rapidly, rendering vehicle to vehicle, vehicle to road, vehicle to pedestrian and vehicle to cloud communications closer. The security of IoV communication may play a crucial role in promoting the development of intelligent transportation and smart city. With the improvement of the communication capability, a large amount of network traffic will follow. However, the limited computing power, complex application environment, and distributed nodes and sensor networks in an IoV may lead to prominent security problem of the IoV. How to ensure the security of the IoV to speed up the application thereof has become a topic widely discussed among automobile manufacturers and researchers. Therefore, using an intrusion detection (ID) technology to ensure the security of IoV communication and identify various malicious attacks has become an important means to guarantee the security of the IoV.

In view of the problem of intrusion detection, scholars at home and abroad have proposed a variety of effective methods, including a machine learning support vector machine (SVM) algorithm, a deep neural network (DNN) model, a multi-layer perception (MLP) algorithm model, etc., which are used to solve the traditional intrusion detection problems. For example, Anish Halima et al. applied the SVM method to an intrusion detection system (IDS). They adopted machine learning algorithms SVM and Naive Bayes, and carried out normalization and feature reduction for analysis and comparison. However, the mechanism of intrusion detection based on machine learning may need a lot of training time to process a large data set of previous network data flows. In a network environment with big data being processed, especially in a complex IoV, the detection time is extremely important. In recent years, with the practical application of emerging technologies in the field of IoVs, IoVs have developed rapidly, rendering vehicle to vehicle, vehicle to road, vehicle to pedestrian and vehicle to cloud communications closer. The security of IoV communication may play a crucial role in promoting the development of intelligent transportation and smart city. With the improvement of the communication capability, a large amount of network traffic will follow. However, the limited computing power, complex application environment, and distributed nodes and sensor networks in an IoV may lead to prominent security problem of the IoV. How to ensure the security of the IoV to speed up the application thereof has become a topic widely discussed among automobile manufacturers and researchers. Therefore, using an intrusion detection (ID) technology to ensure the security of IoV communication and identify various malicious attacks has become an important means to guarantee the security of the IoV. R. Vinayakumar et al. proposed a hybrid DNN model to detect and classify unknown network attacks. Ding Hongwei et al. proposed an intrusion detection method based on a deep convolutional neural network to convert network data into images and reduce dimensions. An accuracy rate of detection, a false alarm rate and a detection rate can be improved by training and recognition.

However, such algorithms described above cannot be directly applied to the actual environment of an IoV. First, the structure of the IoV is complex; not only communication within a vehicle but also interactions of the vehicle with pedestrians, other vehicles, roads and clouds are needed. Second, numerous network communication protocols and approaches are used, including Bluetooth, WiFi, wired and cellular mobile networks, and long term evolution-vehicle to everything (LTE-V2X). Third, a network topology changes rapidly. Since vehicles are moving fast, the network topology of the IoV is also constantly changing according to the actual environment.

Based on the above analysis, how to realize accurate capture of abnormal behavior data in the context of IoV communication by an efficient and reliable intrusion detection method is a technical problem needing to be solved currently.

SUMMARY

An objective of the present disclosure is, in view of the shortcomings of the prior art, to provide an IoV intrusion detection method and device based on an improved convolutional neural network to address the problem how to realize accurate capture of data of an intrusion behavior to an IoV in the context of IoV communication by an efficient and reliable intrusion detection method.

Specifically, the present disclosure is implemented by the following technical solutions.

In a first aspect, the present disclosure provides an Internet of vehicles (IoV) intrusion detection method based on an improved convolutional neural network, where the method includes:
  collecting original data of data traffic during IoV communication, and inputting the original data to a data dimension reduction algorithm model for IoV intrusion detection for preprocessing to obtain standardized data for IoV data analysis;
  inputting the standardized data for IoV data analysis to an improved convolutional neural network model for calculation, including: performing convolutional calculation and nonlinear activation on the input data for layering; performing two convolutional operations, two pooling operations and one full connection operation on each layer of data; and
  classifying a data set output by the improved convolutional neural network model through a SoftMax layer to identify data of an intrusion behavior to the IoV.

Further, the original data of the data traffic during the IoV communication includes:
normal interaction data, including information acquired by an on-board unit from a cloud service platform;
traffic light information of a road side unit and information of road conditions and blind areas acquired by the on-board unit;
information transferred between on-board units and road condition warning information;
data generated in a process that the road side unit uploads road side sensed data or a high-complexity calculation result to the cloud service platform in different protocol types, network connection states and network service types; and
abnormal intrusion data of different attack types during data transmission.

Further, the preprocessing includes:
performing data cleansing on the original data of the data traffic during the IoV communication;
performing a numeralization operation on various forms of data after the data cleansing; and
changing a numerical range of the data after the numeralization operation to decimals in a range of (0, 1), and performing zero-mean normalization.

Further, the performing convolutional calculation and nonlinear activation on the input data is based on the following functions:

$$y_j^l = \sigma\left(\sum_{i \in M_j} y_i^{l-1} w_{ij}^l + b_i^l\right)$$

$$PRelu(y) = \begin{cases} y(y > 0) \\ ay(y \le 0) \end{cases}$$

where $y_j^l$ represents an output value of an activation function for convolutional cell j of layer l, and a calculation result is used as input data to a layering aggregation module; l represents the number of convolutional layers; $\sigma$ represents an activation function; $y_i^{l-1}$ represents input feature i in layer l−1; $w_{ij}^l$ represents a convolutional weight of input matrix i in layer l−1 with position j in layer l; $b_i^l$ represents an offset of a feature map of convolutional layer l from position j; when a value of y is greater than 0, a value of IoV standardized data is y; when y is less than or equal to 0, the value of the IoV standardized data is ay; and a numerical range of a is (0, 1).

Further, the performing two convolutional operations, two pooling operations and one full connection operation on each layer of data includes:
1) performing sampling on features that are subjected to the convolutional calculation and enter a pooling layer, where a function prototype therefor is shown below:

$$z_j^l = \beta(w_j^l \text{ down}(z_j^{l-1}) + b_j^l)$$

where $Z_j^l$ represents an input result calculated for position j of layer l; l represents the number of pooling layers; $\beta$ represents a sampling function; $w_j^l$ represents a pooling weight of position j in a feature map of layer l; $Z_j^{l-1}$ represents input i in layer l−1; down(z) represents a downsampling operation on matrix element z; and $b_j^l$ represents an offset of position j in a feature map of pooling layer l;

2) inputting sampled data that is subjected to two convolutional operations and two pooling operations to a fully connected layer for calculation, and aggregating results by an aggregation function shown below:

$$y_j^l = \sum_i w_{ij}^l * y_i^{l-1} + b_j^l$$

where $y_j^l$ represents a calculated input result of neuron j among neurons in fully connected layer l; $w_{ij}^l$ represents a connection weight for feature i in a feature map of layer l−1 and neuron j in layer l; $y_i^{l-1}$ represents a feature value i in a feature map of layer l−1; and $b_j^l$ represents an offset of neuron j among neurons in fully connected layer l.

The IoV intrusion detection method based on an improved convolutional neural network further includes:
training the improved convolutional neural network model to find an optimal parameter combination.

Further, the training the improved convolutional neural network model includes:
after classifying the data set output by the improved convolutional neural network model through the SoftMax layer, performing a backpropagation method according to a classification detection result output by the SoftMax layer to find the optimal parameter combination, and classifying the data set output by the improved convolutional neural network model by using the optimal parameter combination.

Further, a process of the performing a backpropagation method according to a classification detection result output by the SoftMax layer to find the optimal parameter combination includes:
calculating an overall error parameter value according to the classification detection result output by the SoftMax layer, and continuously adjusting a weight and a deviation by performing a backpropagation operation on the overall error parameter value to find the optimal parameter combination; where
a function used by the SoftMax layer is shown below:

$$\text{Soft Max}(y^l) = \text{Soft Max}\left(\sum w^l * y^{l-1} + b^l\right)$$

where $\text{SoftMax}(y^l)$ represents a classification detection result of layer l; $w^l$ represents a weight of layer l; $y^{l-1}$ represents a feature value of a feature map in layer l−1; and $b_j^l$ represents an offset of a neuron of fully connected layer l; and
the overall error parameter value is calculated by the following method:

$$C(w, b) = \frac{1}{2n}\sum_x y^{(x)} - a^2$$

where C($w$, b) represents a loss function for calculating the overall error parameter value to find an optimal parameter combination of weight $w$ and offset b; w represents a network weight; b represents a network offset; n represents the number of training input data; $y^{(x)}$ represents an input calculated by a fully connected layer when the input is x; and a represents an input of a vector when the input is x.

In another aspect, the present disclosure provides an IoV intrusion detection device based on an improved convolutional neural network, the device including a memory and a processor, where the memory stores a computer program for implementing an IoV intrusion detection method based on an improved convolutional neural network, and the processor executes the computer program to implement steps of the above-described method.

In another aspect, the present disclosure provides a computer readable storage medium, on which a computer program is stored, where the computer program, when executed by the processor, implements steps of the above-described method.

The IoV intrusion detection method and device based on an improved convolutional neural network in the present disclosure have the following beneficial effects:

The IoV intrusion detection method based on an improved convolutional neural network may improve the accuracy of training by layered training and learning, and may detect network date, learn data feature values and look for different classes of data separately by end-to-end classification and backpropagation methods of the convolutional neural network to realize automatic adjustment of parameter values of the convolutional neural network and simplify an algorithm process.

The IoV intrusion detection method based on an improved convolutional neural network can accurately capture abnormal behavior data during IoV communication, increase an accuracy rate of IoV intrusion detection, reduce a false positive rate (false alarm rate) of the IoV intrusion detection, and effectively ensures the security of the IoV communication.

The present disclosure can be applied to vehicle to vehicle, vehicle to road, vehicle to pedestrian and vehicle to cloud communications and interactions in an IoV environment with good migratability.

DETAILED DESCRIPTION OF THE EMBODIMENTS

The present disclosure is further described in more detail below with reference to examples and accompanying drawings.

Example 1

Figure 1:
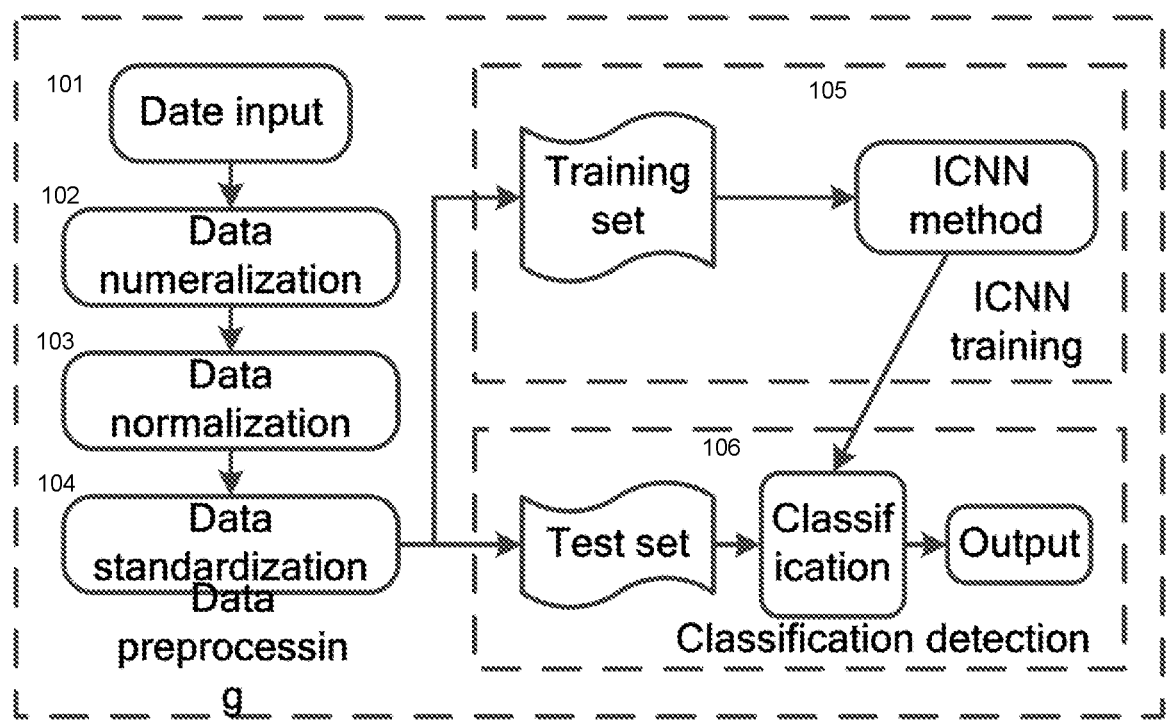
FIG. 1 is a flowchart of an IoV intrusion detection method based on an improved convolutional neural network in the present disclosure.

One example of the present disclosure provides an IoV intrusion detection method based on an improved convolutional neural network to perform intrusion detection on IoV data traffic and acquire a detection effect. As shown in FIG. 1, the method includes the following steps.

I. (Step 101) Original data of data traffic during IoV communication is collected and input to a data dimension reduction algorithm model for IoV intrusion detection for preprocessing to obtain standardized data for IoV data analysis.

1) Regardless of interaction means, all interaction data may be eventually aggregated in a wired way, e.g., by means of optical fibers. Therefore, an intrusion detection device is connected to a transmission node (e.g., a switch or a router) to collect, collect, deduplicate and analyze data.

The data traffic mainly refers to data interaction related data generated during the IoV communication, including:
  a) normal interaction data, including entertainment information services, maps, road conditions, aided driving and the like acquired by an on-board unit (OBU) from a cloud service platform;
  b) traffic light information of a road side unit (RSU) and information of road conditions and blind areas acquired by the OBU;
  c) information transferred between OBUs and road condition warning information, etc.;
  d) data generated in processes such as a process that the RSU uploads road side sensed data or a high-complexity calculation result to the cloud service platform, including collected 3 protocol types (TCP, UDP, and ICMP), 11 network connection states (such as 0TH, REJ, and RST0), and 70 network service types (including auth, bgp, http, ftp, telent, etc.); and
  e) data of an intrusion behavior to the IoV during data transmission, including a denial of service (DoS) attack, a probing attack, a remote to local attack (R2L), a user to root attack (U2R), etc. There are 39 attack types in total in 4 major categories, which are specifically classified with labels such as back, land, neptune, pod, ipsweep, and nmap.

2) (Steps 102-104) Collected communication data is preprocessed, including data cleansing, and numeralization, normalization and standardization of data.

2-1) Data cleansing is performed on the original data of the data traffic during the IoV communication. Specifically, an OBU and an RSU that transmit and receive messages to and from a vehicle detect and process data transmitted during interaction. Wrong data is cleansed and incomplete data is obliterated. Non-numerical data is numeralized into valuable new data.

2-2) A numeralization operation (step 102) is performed on various forms of data after the data cleansing. That is, the data obtained in step 2-1) is converted from original character data into numerical data to facilitate analysis and identification of data content. For example, the protocol types TCP, UDP, and ICMP in attribute features are coded as 1, 2, and 3, respectively.

2-3) A numerical range of the data after the numeralization operation is changed from [0, 58329] to decimals in a range of (0, 1) so that data can be extracted more rapidly and the influence of different dimensions caused by numeralization can be eliminated (step 103). By zero-mean normalization, the data is normalized with the mean and standard deviation of the data. The processed data of the IoV complies with the standard normal distribution with the mean of 0 and the standard deviation of 1 (step 104). The function prototype is shown below:

$$X^* = \frac{X - \mu}{\sigma} \qquad (1)$$

where X* represents a normalized output matrix; x represents an input data matrix; $\mu$ represents a mean of current data collected over the IoV; and $\sigma$ represents a standard deviation of the current data collected over the IoV.

One part of the preprocessed data is input as a training set to a layered convolutional neural network model for training to obtain a trained layered convolutional neural network model (training portion 105), and the other part thereof is input as a test set to the trained layered convolutional neural network model for classification detection of an intrusion (testing portion 106).

II. The standardized data for IoV data analysis is input to an improved convolutional neural network model for calculation.

Figure 2:
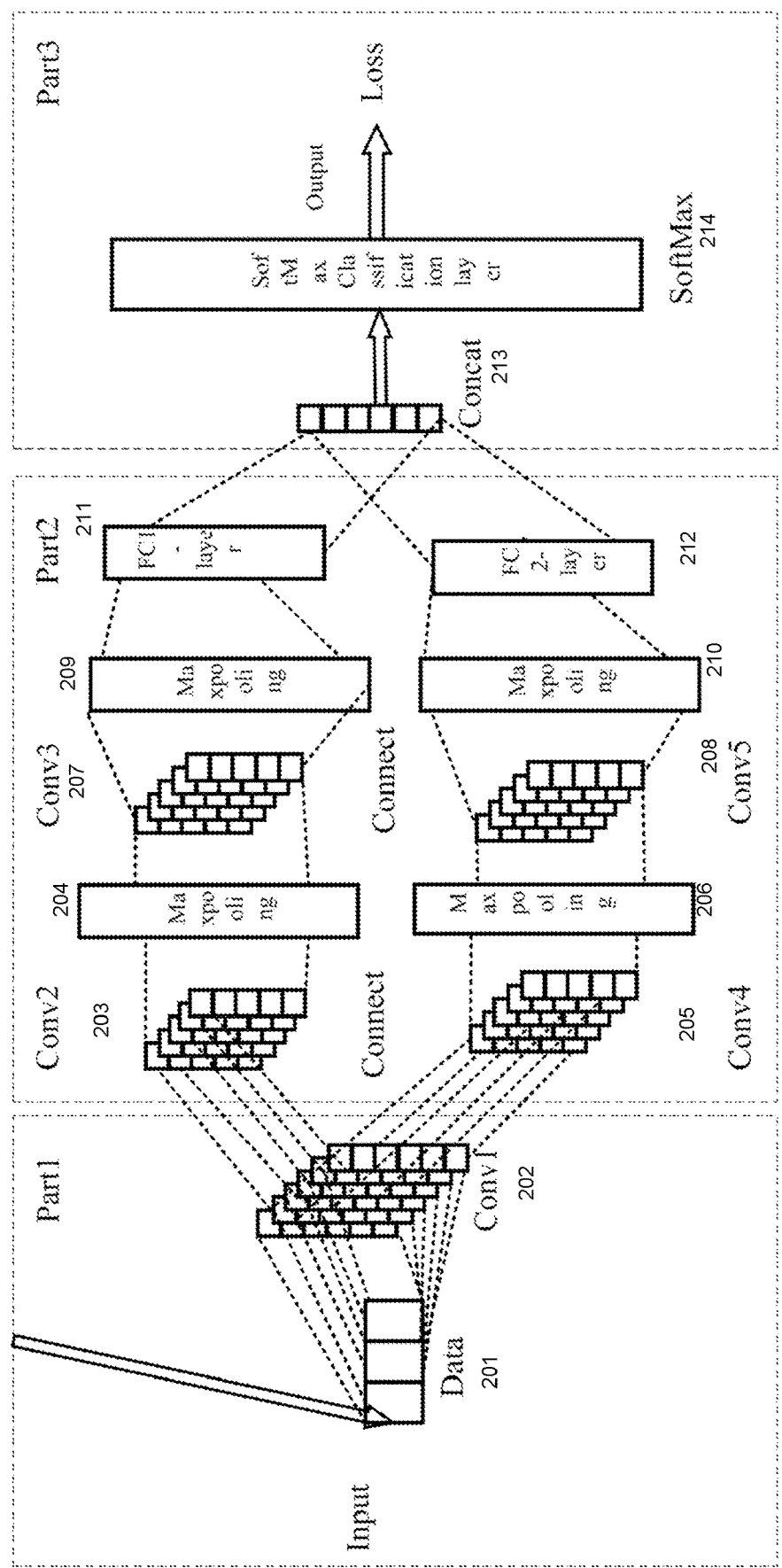
FIG. 2 is a schematic diagram of an improved convolutional neural network model in the present disclosure.

As shown in FIG. 2, a first part (Part 1) of the structure of the layered convolutional neural network model is a data input module, including convolutional calculation and nonlinear activation (Conv1). The function prototype is shown below:

$$y_j^l = \sigma\left(\sum_{i \in M_j} y_i^{l-1} w_{ij}^l + b_i^l\right) \qquad (2)$$

$$PRelu(y) = \begin{cases} y(y > 0) \\ ay(y \le 0) \end{cases} \qquad (3)$$

where $y_j^l$ represents an output value of an activation function for convolutional cell j of layer l, and a calculation result is used as input data to a layering aggregation module; l represents the number of convolutional layers; $\sigma$ represents an activation function; $y_i^{l-1}$ represents input feature i in layer l−1; $w_{ij}^l$ represents a convolutional weight of input matrix i in layer l−1 with position j in layer l; $b_i^l$ represents an offset of a feature map of convolutional layer l from position j; when a value of y is greater than 0, a value of IoV standardized data is y; when y is less than or equal to 0, the value of the IoV standardized data is ay; and a numerical range of a is (0, 1). Preferably, the value of a is 0.25.

A second part (Part2) of the structure of the layered convolutional neural network model is a layering aggregation module. Batch-wise calculation is performed on each layer of data input in the module, including performing two convolutional operations (Conv), two pooling operations (Maxpooling) and one full connection operation (FC):

1) Sampling is performed on features that are subjected to the convolutional calculation and enter a pooling layer, and the function prototype therefor is shown below:

$$z_j^l = \beta(w_j^l \text{ down}(z_j^{l-1}) + b_j^l) \qquad (4)$$

where $Z_j^l$ represents an input result calculated for position j of layer l; l represents the number of pooling layers; $\beta$ represents a sampling function; $w_j^l$ represents a pooling weight of position j in a feature map of layer l; $Z_j^{l-1}$ represents input i in layer l−1; down(z) represents a downsampling operation on matrix element z; and $b_j^l$ represents an offset of position j in a feature map of pooling layer l.

2) Subsequently, sampled data that is subjected to two convolutional operations and two pooling operations is input to a fully connected layer for calculation, and results are aggregated by using an aggregation function shown below:

$$y_j^l = \sum_i w_{ij}^l * y_i^{l-1} + b_j^l \qquad (5)$$

where $y_j^l$ represents a calculated input result of neuron j among neurons in fully connected layer l; $w_{ij}^l$ represents a connection weight for feature i in a feature map of layer l−1 and neuron j in layer l; $y_i^{l-1}$ represents a feature value i in a feature map of layer l−1; and $b_j^l$ represents an offset of neuron j among neurons in fully connected layer l.

FIG. 2 illustrate a process of inputting the preprocessed data to the layered convolutional neural network model for calculation.

1. The input data 201 firstly passes through one convolutional layer (Conv1) 202. All the input data needs to be subjected to convolutional and nonlinear activation calculation once for dimension reduction, and a result of calculation is used as input data to the layering aggregation module.

2. The layering aggregation module performs layering convolutional processing on the input data after the convolutional (Conv1) calculation. Conv2 203 and Conv3 207 make up a group, and Conv4 205 and Conv5 208 make up a group. Each feature map obtained through each convolutional calculation is sampled by the pooling layer. After the convolution result of the convolutional layer (Conv2) is sampled by the pooling layer (MaxPooling1) 204, the result is input to the convolutional layer (Conv3) 207 for convolutional calculation, and the result thus obtained is then sampled by the pooling layer (MaxPooling2) 209. The purpose for doing this is to reduce dimensions of the data and extract region features of data as much as possible. The results of the layered convolutional calculation (i.e., outputs of MaxPooling1 and MaxPooling4, 209 and 210) pass through respectively fully connected layers (FC1_Layer1, FC1_Layer2) 211 and 212, respectively, to obtain a data set.

3. Output results of the fully connected layers 211 and 212 (FC1_Layer and FC2_Layer) are aggregated by using Concat function 213 to generate a complete data set. Preferably, the results of the fully connected layers 211 and 212 are merged through the Concat function in TensorFlow.

III. A data set output by the improved convolutional neural network model is classified through a SoftMax layer 214 to identify data of an intrusion behavior to the IoV.

A SoftMax function is shown below:

$$\text{Soft Max}(y^l) = \text{Soft Max}\left(\sum w^l * y^{l-1} + b^l\right) \quad (6)$$

where SoftMax($y^l$) represents a classification detection result of layer l; $w^l$ represents a weight of layer l; $y^{l-1}$ represents a feature value of a feature map in layer l–1; and $b_j^l$ represents an offset of a neuron of fully connected layer l.

Since there is an error between the classification detection result output through the SoftMax layer and an actual desired value, in another embodiment, when training the improved convolutional neural network, a backpropagation method is performed according to the classification detection result output by the SoftMax layer to find an optimal parameter combination. Specifically, an overall error parameter value is calculated according to the classification detection result output by the SoftMax layer, and a weight and a deviation are continuously adjusted by performing a backpropagation operation on the overall error parameter value to find the optimal parameter combination output, thereby outputting a desired result, reducing the influence produced by the error and achieving a good convergence effect. The overall error parameter value is calculated by the following method:

$$C(w, b) = \frac{1}{2n} \sum_x y^{(x)} - a^2 \quad (7)$$

where C($w$, b) represents a loss function for calculating the overall error parameter value to find an optimal parameter combination of weight $w$ and offset b; w represents a network weight; b represents a network offset; n represents the number of training input data; $y^{(x)}$ represents an input calculated by a fully connected layer when the input is x; and a represents an input of a vector when the input is x.

Figure 3:
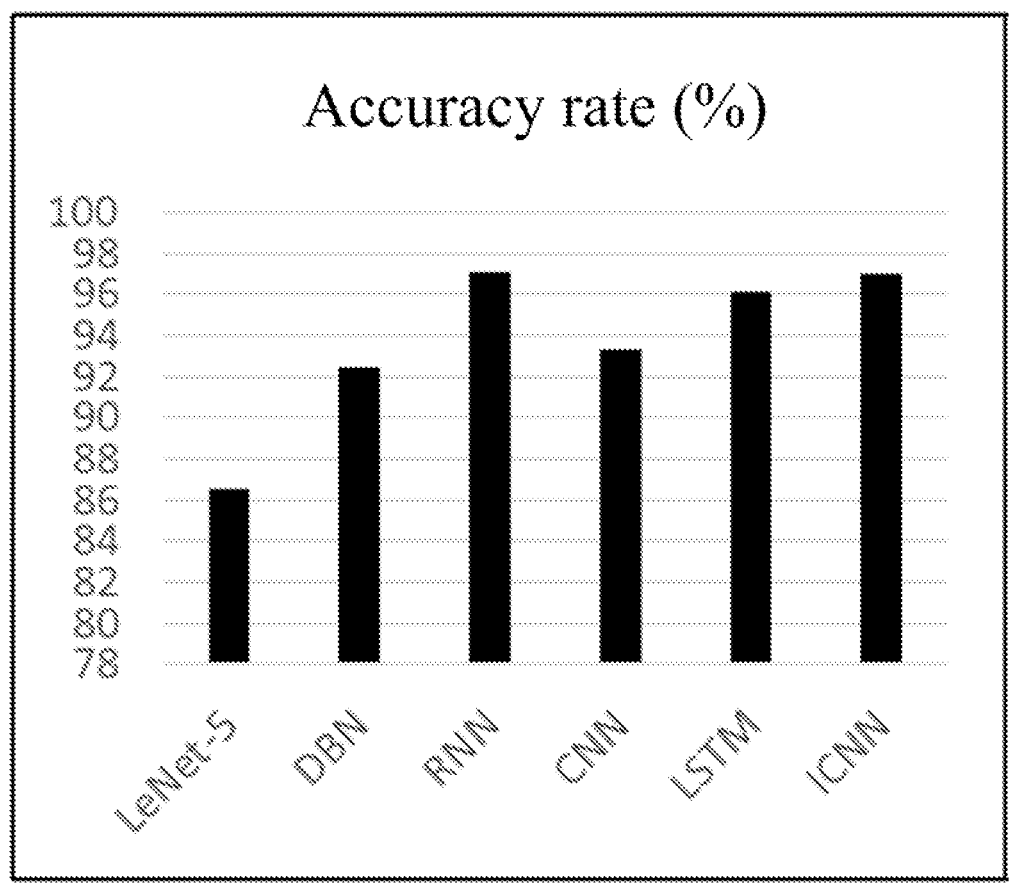
FIG. 3 is a diagram illustrating a comparison on accuracy rate between relevant methods in the present disclosure and in the prior art (148517 pieces of data)
Figure 4:
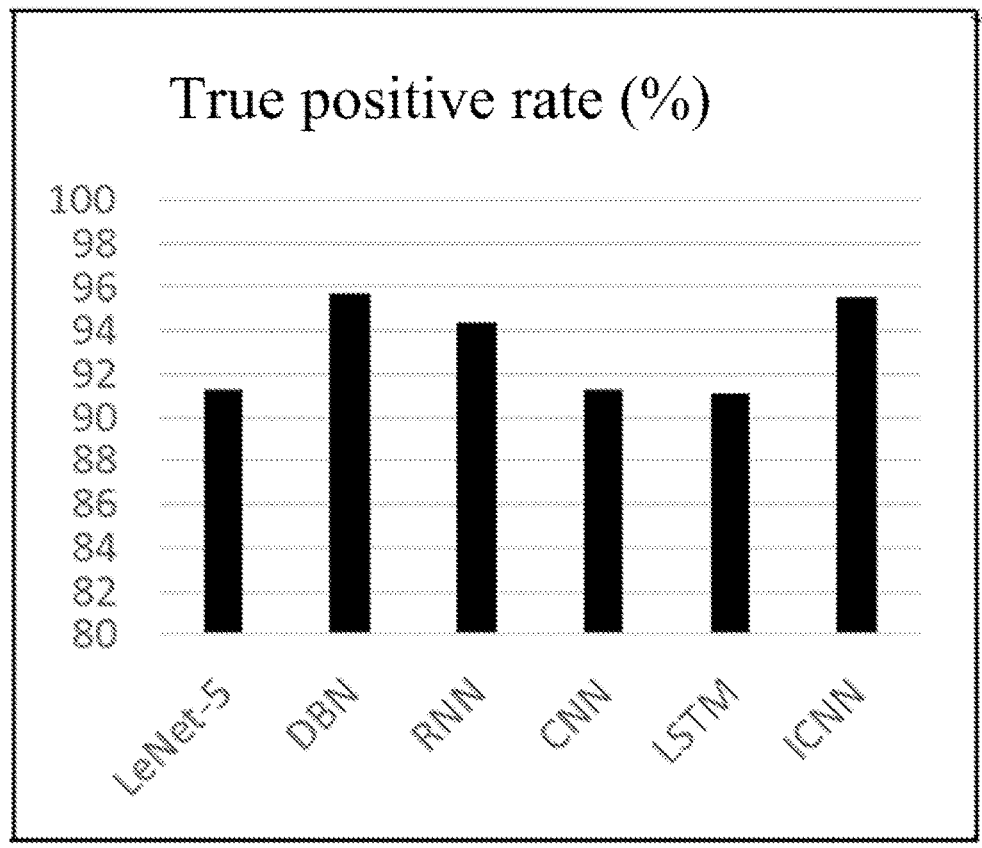
FIG. 4 is a diagram illustrating a comparison on true positive rate between relevant methods in the present disclosure and in the prior art (148517 pieces of data)
Figure 5:
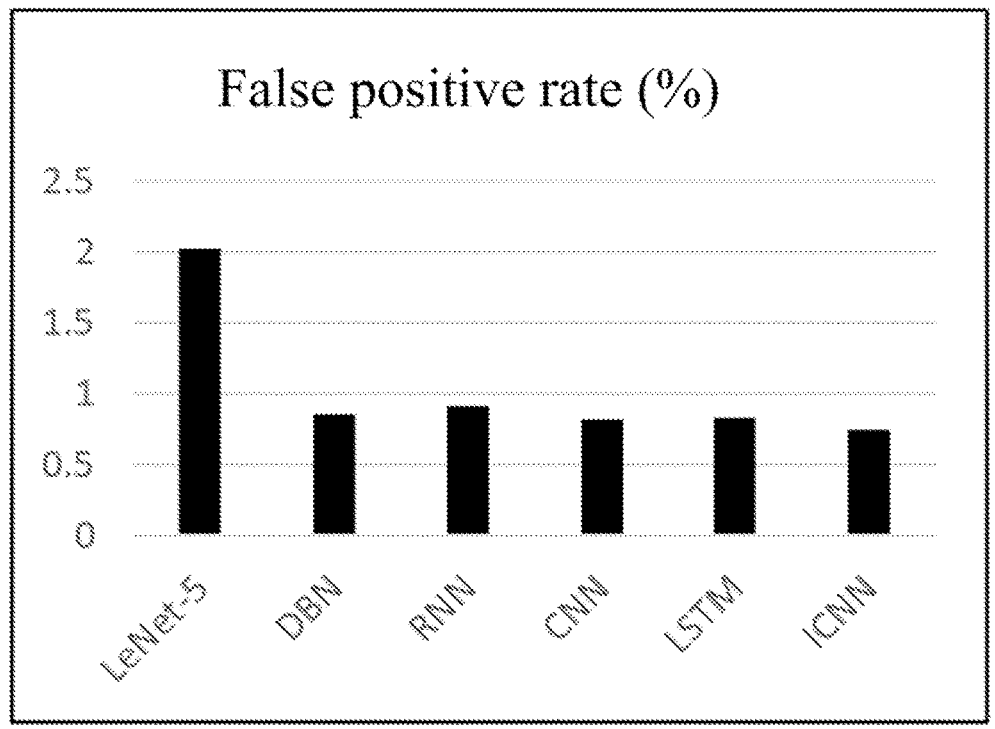
FIG. 5 is a diagram illustrating a comparison on false positive rate between relevant methods in the present disclosure and in the prior art (148517 pieces of data)
Figure 6:
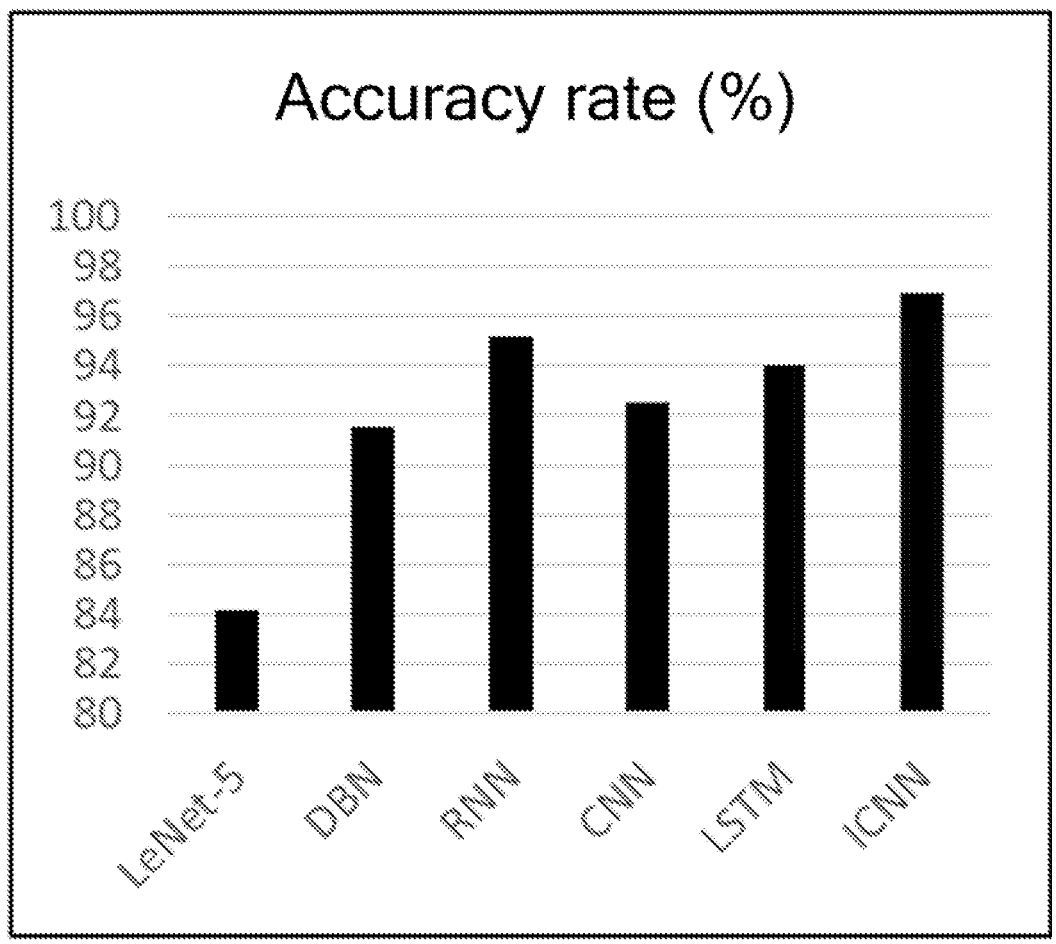
FIG. 6 is a diagram illustrating a comparison on accuracy rate between relevant methods in the present disclosure and in the prior art (121981 pieces of data)
Figure 7:
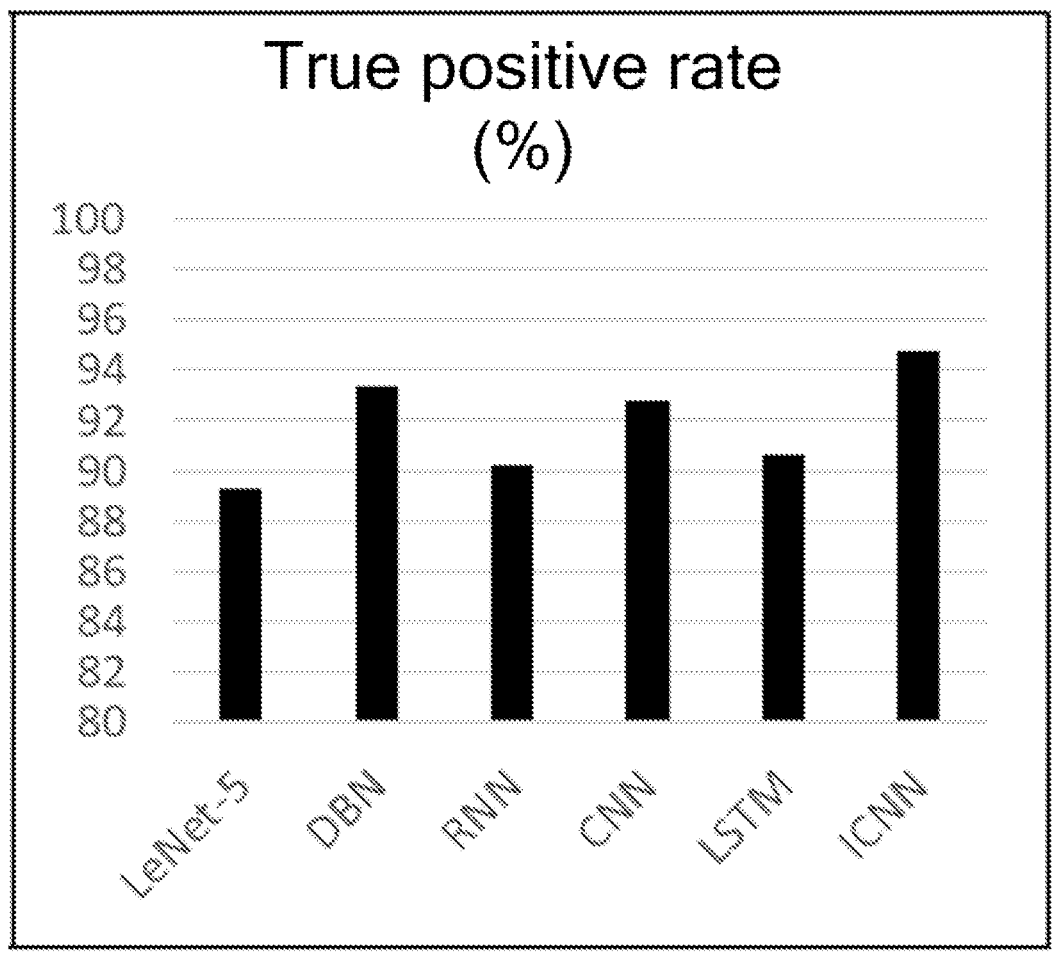
FIG. 7 is a diagram illustrating a comparison on true positive rate between relevant methods in the present disclosure and in the prior art (121981 pieces of data)
Figure 8:
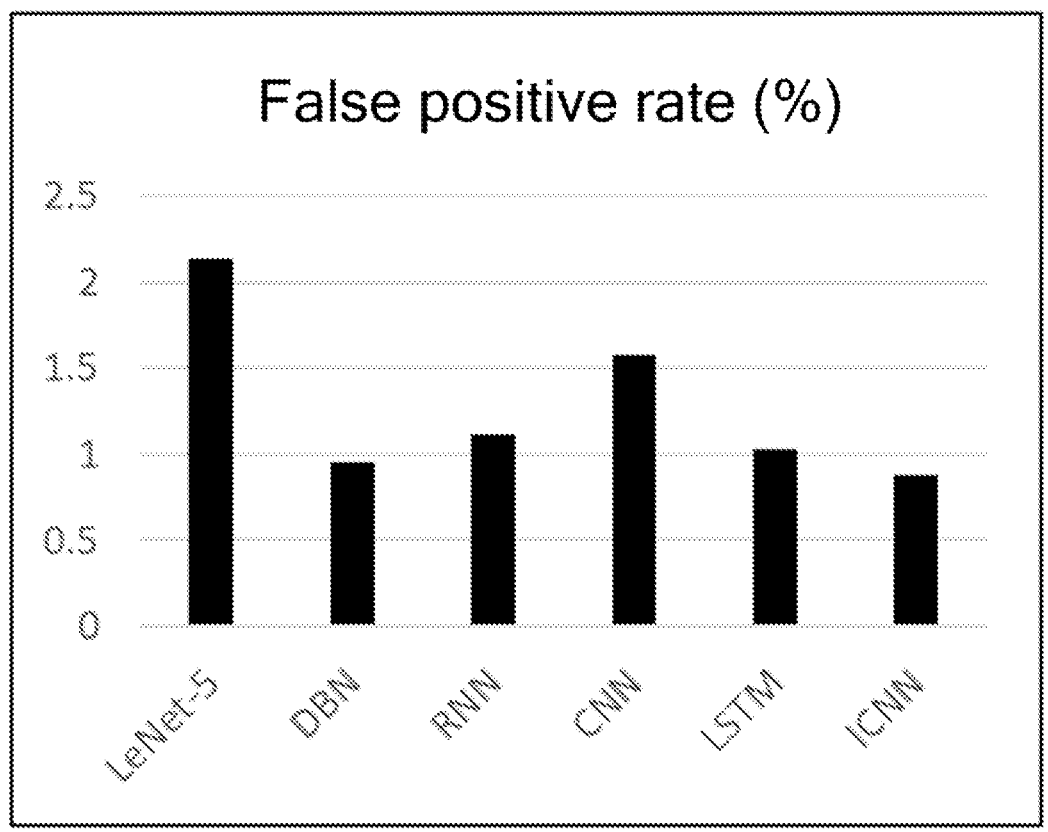
FIG. 8 is a diagram illustrating a comparison on false positive rate between relevant methods in the present disclosure and in the prior art (121981 pieces of data).

To verify that the method of the present disclosure has a better effect than the prior art, relevant data sets are used to perform contrast verification on the method. FIG. 3, FIG. 4, FIG. 5, FIG. 6, FIG. 7 and FIG. 8 show comparison results of the improved convolutional neural network (ICNN) with some methods in the prior art (LeNet-5, DBN, RNN, CNN, LSTM). FIG. 3, FIG. 4 and FIG. 5 show a comparison on NSL-KDD data set, in which 148517 pieces of data in total are used, FIG. 6, FIG. 7 and FIG. 8 show a comparison on UNSW-NB15 data set, in which 121981 pieces of data in total are used. By comparing five different methods with the method of the present disclosure, FIG. 3 and FIG. 6 show that the ICNN method reaches an accuracy rate of 97.01% and an accuracy rate of 96.92%, respectively; FIG. 4 and FIG. 7 show that the ICNN method reaches a true positive rate of 95.55% and a true positive rate of 94.76%, respectively; and FIG. 5 and FIG. 8 show that the ICNN method reaches a false positive rate (false alarm rate) of 0.75% and a false positive rate (false alarm rate) of 0.88%, respectively. Therefore, the detection result of the ICNN method has better effect than other detection methods in intrusion detection data samples. An accuracy rate of intrusion detection can be increased and a false positive rate (false alarm rate) of intrusion detection can be reduced.

In some embodiments, some aspects of the technique described above may be implemented by one or more processors of a processing system executing software. The software includes stores or tangibly implements in other ways one or more executable instruction sets on a non-transient computer readable storage medium. The software may include instructions and some data which, when executed by one or more processors, manipulate the one or more processors to perform one or more aspects of the technique described above. The non-transient computer readable storage medium may include, for example, a magnetic or optical disk storage device, such as solid-state storage devices like a flash memory, a cache, a random access memory (RAM), etc. or other nonvolatile memory devices. Executable instructions stored on the non-transient computer readable storage medium may be source codes, assembly language codes, target codes, or in other instruction formations explained or executed in other ways by one or more processors.

The computer readable storage medium may include any storage medium accessible by a computer system to provided instructions and/or data to the computer systems during use or a combination of storage mediums. Such a storage medium may include but be not limited to an optical medium (e.g., a compact disc (CD), a digital versatile disc (DVD) or a blue-ray disc), a magnetic medium (e.g., a floppy disc, a magnetic tape or a magnetic hard drive), a volatile memory (e.g., a random access memory (RAM) or a cache), a nonvolatile memory (e.g., a read-only memory (ROM) or a flash memory) or a storage medium based on a micro electro mechanical system (MEMS). The computer readable storage medium may be embedded in a computing system (e.g., a system RAM or ROM), fixedly attached to a computing system (e.g., a magnetic hard drive), removably attached to a computing system (e.g., a CD or a flash memory based on a universal serial bus (USB)), or coupled to a computer system via a wired or wireless network (e.g., network accessible storage (NAS)).

It needs to be noted that not all acts or elements in the above general description are essential and a part of a specific act or device may be not essential. Moreover, one or more further acts or included elements may be performed in addition to those described. Still further, the sequence of acts listed is not necessarily the sequence of performing them. Moreover, these concepts have been described with reference to specific embodiments. However, it will be recognized by those of ordinary skill in the art that various alternations and changes may be made without departing from the scope of the present disclosure set forth in the appended claims. Therefore, the description and the accompanying drawings are considered to be illustrative rather than limiting, and all such alternations are included within the scope of the present disclosure.

Benefits, other advantages and solutions to problems have been described above with respect to specific embodiments. However, benefits, advantages and solutions to problems that may cause any benefit, advantage or solution to occur or become more apparent and any feature should not be construed as critical or necessary features for any or other aspects or essential features for any or all claims. Moreover, the specific embodiments described above are merely illustrative because the disclosed subject matter may be modified and implemented in such a manner that is apparently different but equivalent for those skilled in the art who benefit from the teaching herein. In addition to those described in the claims, it is not intended to limit configurations shown herein or designed details. Therefore, it is obvious that the specific embodiments disclosed above may be changed or alternated and all such changes are considered to be within the scope of the disclosed subject matter.

What is claimed is:

1. An Internet of vehicles (IoV) intrusion detection method based on an improved convolutional neural network, the method comprising:
   collecting original data of data traffic during IoV communication, and inputting the original data to a data dimension reduction algorithm model for IoV intrusion detection for preprocessing to obtain standardized data for IoV data analysis;
   inputting the standardized data for IoV data analysis to an improved convolutional neural network model for calculation, comprising: performing convolutional calculation and nonlinear activation on the input data for layering; performing two convolutional operations, two pooling operations and one full connection operation on each layer of data; and
   classifying a data set output by the improved convolutional neural network model through a SoftMax layer to identify data of an intrusion behavior to the IoV.

2. The IoV intrusion detection method based on an improved convolutional neural network according to claim 1, wherein the original data of the data traffic during the IoV communication comprises:
   normal interaction data, comprising information acquired by an on-board unit from a cloud service platform;
   traffic light information of a road side unit and information of road conditions and blind areas acquired by the on-board unit;
   information transferred between on-board units and road condition warning information;
   data generated in a process that the road side unit uploads road side sensed data or a high-complexity calculation result to the cloud service platform in different protocol types, network connection states and network service types; and
   abnormal intrusion data of different attack types during data transmission.

3. The IoV intrusion detection method based on an improved convolutional neural network according to claim 1, wherein the preprocessing comprises:
   performing data cleansing on the original data of the data traffic during the IoV communication;
   performing a numeralization operation on various forms of data after the data cleansing; and
   changing a numerical range of the data after the numeralization operation to decimals in a range of (0, 1), and performing zero-mean normalization.

4. The IoV intrusion detection method based on an improved convolutional neural network according to claim 1, wherein the performing convolutional calculation and nonlinear activation on the input data is based on the following functions:

$$y_j^l = \sigma\left(\sum_{i \in M_j} y_i^{l-1} w_{ij}^l + b_i^l\right)$$

$$PRelu(y) = \begin{cases} y(y > 0) \\ ay(y \le 0) \end{cases}$$

wherein $y_j^l$ represents an output value of an activation function for convolutional cell j of layer l, and a calculation result is used as input data to a layering aggregation module; l represents a number of convolutional layers; $\sigma$ represents an activation function; $y_i^{l-1}$ represents input feature i in layer l–1; $w_{ij}^l$ represents a convolutional weight of input matrix i in layer l–1 with position j in layer l; $b_i^l$ represents an offset of a feature map of convolutional layer (from position j; when a value of y is greater than 0, a value of IoV standardized data is y; when y is less than or equal to 0, the value of the IoV standardized data is ay; and a numerical range of a is (0, 1).

5. The IoV intrusion detection method based on an improved convolutional neural network according to claim 1, wherein the performing two convolutional operations, two pooling operations and one full connection operation on each layer of data comprises:
   1) performing sampling on features that are subjected to the convolutional calculation and enter a pooling layer, wherein a function prototype therefor is shown below:

$$z_j^l = \beta\left(w_j^l \text{ down}\left(z_j^{l-1}\right) + b_j^l\right)$$

wherein $Z_j^l$ represents an input result calculated for position j of layer l; l represents a number of pooling layers; $\beta$ represents a sampling function; $w_j^l$ represents a pooling weight of position j in a feature map of layer l; $Z_j^{l-1}$ represents input i in layer l–1; down(z) represents a downsampling operation on matrix element z; and $b_j^l$ represents an offset of position j in a feature map of pooling layer l;
   2) inputting sampled data that is subjected to two convolutional operations and two pooling operations to a fully connected layer for calculation, and aggregating results by an aggregation function shown below:

$$y_j^l = \sum_i w_{ij}^l * y_i^{l-1} + b_j^l$$

wherein $y_j^l$ represents a calculated input result of neuron j among neurons in fully connected layer l; $w_{ij}^l$ represents a connection weight for feature i in a feature map of layer l–1 and neuron j in layer l; $y_i^{l-1}$ represents a feature value i in a feature map of layer l–1; and $b_j^l$ represents an offset of neuron j among neurons in fully connected layer l.

6. The IoV intrusion detection method based on an improved convolutional neural network according to claim 1, further comprising:
   training the improved convolutional neural network model to find an optimal parameter combination.

7. The IoV intrusion detection method based on an improved convolutional neural network according to claim 6, wherein the training the improved convolutional neural network model comprises:
   after classifying the data set output by the improved convolutional neural network model through the SoftMax layer, performing a backpropagation method according to a classification detection result output by the SoftMax layer to find the optimal parameter combination, and classifying the data set output by the improved convolutional neural network model by using the optimal parameter combination.

8. The IoV intrusion detection method based on an improved convolutional neural network according to claim 7, wherein a process of the performing a backpropagation method according to a classification detection result output by the SoftMax layer to find the optimal parameter combination comprises:
calculating an overall error parameter value according to the classification detection result output by the SoftMax layer, and continuously adjusting a weight and a deviation by performing a backpropagation operation on the overall error parameter value to find the optimal parameter combination; wherein
a function used by the SoftMax layer is shown below:

$$\text{Soft Max}(y^l) = \text{Soft Max}\left(\sum w^l * y^{l-1} + b^l\right)$$

wherein SoftMax($y^l$) represents a classification detection result of layer l; $w^l$ represents a weight of layer l; $y^{l-1}$ represents a feature value of a feature map in layer l−1; and $b_j^l$ represents an offset of a neuron of fully connected layer l; and
the overall error parameter value is calculated by the following method:

$$C(w, b) = \frac{1}{2n}\sum_x y^{(x)} - a^2$$

wherein $C(w,b)$ represents a loss function for calculating the overall error parameter value to find an optimal parameter combination of weight $w$ and offset b; w represents a network weight; b represents a network offset; n represents a number of training input data; $y^{(x)}$ represents an input calculated by a fully connected layer when the input is x; and a represents an input of a vector when the input is x.

9. An IoV intrusion detection device based on an improved convolutional neural network, the device comprising a memory and a processor, wherein the memory stores a computer program for implementing an IoV intrusion detection method based on an improved convolutional neural network, and the processor executes the computer program to implement steps of the method according to claim 1.

10. The IoV intrusion detection device according to claim 9, wherein the original data of the data traffic during the IoV communication comprises:
normal interaction data, comprising information acquired by an on-board unit from a cloud service platform;
traffic light information of a road side unit and information of road conditions and blind areas acquired by the on-board unit;
information transferred between on-board units and road condition warning information;
data generated in a process that the road side unit uploads road side sensed data or a high-complexity calculation result to the cloud service platform in different protocol types, network connection states and network service types; and
abnormal intrusion data of different attack types during data transmission.

11. The IoV intrusion detection device according to claim 9, wherein the preprocessing comprises:
performing data cleansing on the original data of the data traffic during the IoV communication;
performing a numeralization operation on various forms of data after the data cleansing; and
changing a numerical range of the data after the numeralization operation to decimals in a range of (0, 1), and performing zero-mean normalization.

12. The IoV intrusion detection device according to claim 9, wherein the performing convolutional calculation and nonlinear activation on the input data is based on the following functions:

$$y_j^l = \sigma\left(\sum_{i \in M_j} y_i^{l-1} w_{ij}^l + b_i^l\right)$$

$$PRelu(y) = \begin{cases} y(y > 0) \\ ay(y \leq 0) \end{cases}$$

wherein $y_j^l$ represents an output value of an activation function for convolutional cell j of layer l, and a calculation result is used as input data to a layering aggregation module; l represents a number of convolutional layers; σ represents an activation function; $y_i^{l-1}$ represents input feature i in layer l−1; $w_{ij}^l$ represents a convolutional weight of input matrix i in layer l−1 with position j in layer l; $b_i^l$ represents an offset of a feature map of convolutional layer l from position j; when a value of y is greater than 0, a value of IoV standardized data is y; when y is less than or equal to 0, the value of the IoV standardized data is ay; and a numerical range of a is (0, 1).

13. The IoV intrusion detection device according to claim 9, wherein the performing two convolutional operations, two pooling operations and one full connection operation on each layer of data comprises:
1) performing sampling on features that are subjected to the convolutional calculation and enter a pooling layer, wherein a function prototype therefor is shown below:

$$z_j^l = \beta\left(w_j^l \text{ down}\left(z_j^{l-1}\right) + b_j^l\right)$$

wherein $Z_j^l$ represents an input result calculated for position j of layer l; l represents a number of pooling layers; β represents a sampling function; $w_j^l$ represents a pooling weight of position j in a feature map of layer l; $Z_j^{l-1}$ represents input i in layer l−1; down(z) represents a downsampling operation on matrix element z; and $b_j^l$ represents an offset of position j in a feature map of pooling layer l;
2) inputting sampled data that is subjected to two convolutional operations and two pooling operations to a fully connected layer for calculation, and aggregating results by an aggregation function shown below:

$$y_j^l = \sum_i w_{ij}^l * y_i^{l-1} + b_j^l$$

wherein $y_j^l$ represents a calculated input result of neuron j among neurons in fully connected layer l; $w_{ij}^l$ represents a connection weight for feature i in a feature map of layer l−1 and neuron j in layer l; $y_i^{l-1}$ represents a feature value i in a feature map of layer l−1; and $b_j^l$ represents an offset of neuron j among neurons in fully connected layer l.

14. The IoV intrusion detection device according to claim 9, further comprising:

training the improved convolutional neural network model to find an optimal parameter combination.

15. The IoV intrusion detection device according to claim 14, wherein the training the improved convolutional neural network model comprises:

after classifying the data set output by the improved convolutional neural network model through the Soft-Max layer, performing a backpropagation method according to a classification detection result output by the SoftMax layer to find the optimal parameter combination, and classifying the data set output by the improved convolutional neural network model by using the optimal parameter combination.

16. The IoV intrusion detection device according to claim 15, wherein a process of the performing a backpropagation method according to a classification detection result output by the SoftMax layer to find the optimal parameter combination comprises:

calculating an overall error parameter value according to the classification detection result output by the SoftMax layer, and continuously adjusting a weight and a deviation by performing a backpropagation operation on the overall error parameter value to find the optimal parameter combination; wherein a function used by the SoftMax layer is shown below:

$$\text{Soft Max}(y^l) = \text{Soft Max}\left(\sum w^l * y^{l-1} + b^l\right)$$

wherein SoftMax($y^l$) represents a classification detection result of layer l; $w^l$ represents a weight of layer l; $y^{l-1}$ represents a feature value of a feature map in layer l−1; and $b_j^l$ represents an offset of a neuron of fully connected layer l; and the overall error parameter value is calculated by the following method:

$$C(w, b) = \frac{1}{2n}\sum_x y^{(x)} - a^2$$

wherein C($w$,b) represents a loss function for calculating the overall error parameter value to find an optimal parameter combination of weight $w$ and offset b; w represents a network weight; b represents a network offset; n represents a number of training input data; $y^{(x)}$ represents an input calculated by a fully connected layer when the input is x; and a represents an input of a vector when the input is x.

17. A non-transitory computer readable storage medium, on which a computer program is stored, wherein the computer program, when executed by a processor, implements steps of the method according to claim 1.

18. The non-transitory computer readable storage medium according to claim 17, wherein the original data of the data traffic during the IoV communication comprises:

normal interaction data, comprising information acquired by an on-board unit from a cloud service platform;

traffic light information of a road side unit and information of road conditions and blind areas acquired by the on-board unit;

information transferred between on-board units and road condition warning information;

data generated in a process that the road side unit uploads road side sensed data or a high-complexity calculation result to the cloud service platform in different protocol types, network connection states and network service types; and abnormal intrusion data of different attack types during data transmission.

19. The non-transitory computer readable storage medium according to claim 17, wherein the preprocessing comprises:

performing data cleansing on the original data of the data traffic during the IoV communication;

performing a numeralization operation on various forms of data after the data cleansing; and changing a numerical range of the data after the numeralization operation to decimals in a range of (0, 1), and performing zero-mean normalization.

20. The non-transitory computer readable storage medium according to claim 17, wherein the performing convolutional calculation and nonlinear activation on the input data is based on the following functions:

$$y_j^l = \sigma\left(\sum_{i \in M_j} y_i^{l-1} w_{ij}^l + b_i^l\right)$$

$$PRelu(y) = \begin{cases} y(y > 0) \\ ay(y \le 0) \end{cases}$$

wherein $y_j^l$ represents an output value of an activation function for convolutional cell j of layer l, and a calculation result is used as input data to a layering aggregation module; l represents a number of convolutional layers; σ represents an activation function; $y_i^{l-1}$ represents input feature i in layer l−1; $w_{ij}^l$ represents a convolutional weight of input matrix i in layer l−1 with, position j in layer l; $b_i^l$ represents an offset of a feature map of convolutional layer l from position j; when a value of y is greater than 0, a value of IoV standardized data is y; when y is less than or equal to 0, the value of the IoV standardized data is ay; and a numerical range of a is (0, 1).

* * * * *